Feb. 26, 1963     L. P. REY     3,078,586

PRESERVING WATER-CONTAINING ORGANIC OR INORGANIC SUBSTANCES

Filed May 18, 1960

INVENTOR
LOUIS PHILIBERT REY

By
Hammond & Littell
ATTORNEY

United States Patent Office 3,078,586
Patented Feb. 26, 1963

3,078,586
PRESERVING WATER-CONTAINING ORGANIC
OR INORGANIC SUBSTANCES
Louis Philibert Rey, Saint-Cloud Val d'Or, France, assignor to Centre National de la Recherche Scientifique, Paris, France, a corporation of France
Filed May 18, 1960, Ser. No. 29,865
Claims priority, application France June 11, 1959
6 Claims. (Cl. 34—5)

This invention relates to the low-temperature treatment of water-containing solid substances for the purpose of preserving them against deterioration. The invention is applicable to a wide range of solid substances, both organic and inorganic, such as food products, biological materials to be stored for medical and/or scientific purposes, e.g. fragments of animal organs and tissue, as well as various extract substances such as serums, hormones, vitamins. As mentioned above, various inorganic chemicals subject to deterioration are also susceptible to the application of the invention.

The objects of the invention include the provision of improved methods of processing such substances for the subsequent preservation thereof, and particularly to the improved monitoring of such low-temperature preserving processes whereby both the economy, and the efficiency and reliability of such processes will be considerably enhanced.

The deterioration of substances of the kinds herein contemplated is primarily ascribable to the presence of free water and of water bonded by way of labile bonds in the molecular structure. Consequently a considerable amount of work has been done by past investigators in an attempt to extract such water by a process that would not in turn be the cause of some irreversible effect conducive to a deterioration of the treated substance.

Attempts at a direct desiccation of the substances have failed since the direct conversion of liquid water into water vapour, as by evaporation at ordinary temperatures in vacuo, will unescapably result in profound and irreversible modifications in the texture of the processed materials, regardless of the precautions taken. Such attempts have therefore been abandoned and investigators have turned to other methods.

One method that has yielded generally satisfactory results has involved subjecting the sample to a freezing treatment in order to freeze the water as ice in situ and thereby impart a high rigidity to the physico-chemical structure of the material. However, the frozen sample in order to be preserved must be continually exposed to low or extremely low temperatures, thereby greatly detracting from the practical value of such methods especially in cases where the frozen products have to be transported over long distances.

Recently there has been proposed a method of preservation variously known as freeze-drying, cryo-desiccation, or lyophilization. This process basically consists in a low-temperature dehydration of the frozen samples by direct sublimation of the ice in it under reduced pressure. A direct conversion from the solid to the gaseous phase is here involved, and at no point in the process is liquid water present. After the dehydrating step the substance may conveniently be stored in a dry atmosphere at ordinary temperature. In order to restore the substance to its pristine form it is only necessary to reintroduce into it the same amount of water as that removed from it in the processing.

In conventional lyophilization apparatus, the ice-sublimating step is generally performed in an enclosure in which a vacuum can be maintained, and the extracted vapour is condensed on a cold surface. Since the sublimation of ice is highly endo-thermic (absorbing 650 calories per gram at —30° C.), the temperature of the sample tends to drop during the operation, thereby reducing the rate at which sublimation proceeds. In order to avoid excessive operating times therefore, some heating means must be provided which will supply heat in amounts equivalent to that removed by sublimation.

The operation of most conventoinal lyophilizing apparatus is controlled or monitored in terms of temperature measurement. In some apparatus means are provided for obtaining some prescribed law of temperature variation of the product versus time throughout the process.

The methods of regulating such processes on the basis of temperature measurements suffer from an inherent disadvantage in that they do not provide any means of appreciating the actual structural modifications occurring within the processed substance during treatment. All that is provided is an over-all indication which does not even make it possible to discriminate between the temperature in the dehydrated portion and the temperature in the frozen portion within a given sample. In addition, temperature is not a reliable reference whereby to determine the structure of the material, due to various and complex physico-chemical phenomena such as supercooling and the like, which considerably modify the thermal conditions.

For the above reasons, it has been necessary heretofore, before any industrial process, to perform a number of preliminary tests serving to evaluate in connection with each group of samples to be treated the particular values to be used for the operating factors of the regulating system. Moreover, a large safety margin had to be allowed for in the selection of such values if a partial or complete deterioration of the materials was to be avoided. Since the actual treating temperature was thus considerably lower than the optimum temperature, the sublimation rate and hence the output rate of the plant were correspondingly and greatly reduced. If on the other hand in an attempt to increase the production rate the operating temperature was maintained close to its highest permissible value, the yield in product meeting specifications would in turn be reduced.

It has been attempted to avoid the above difficulties by resorting to a different method of regulation or monitoring, based on a measurement of the vapour tension present within the frozen portions and the fluid portions of the material. This however requires the use of complex apparatus having considerable response delay or inertia, and its principle moreover is inherently incapable of leading to fully successful results since the only portion of a sample accessible to the measurements required is that area lying close to the interface between the dry and the frozen portions of the substance, which interface gradually advances deeper and deeper into the sample as the treatment progresses. The degree of reliable protection afforded by such monitoring methods is therefore necessarily limited.

In another connection, the applicants are aware that it has heretofore been proposed in the refrigerator art, to determine and regulate the quantity of "cold units" or "frigories" (negative calories) remaining available in a refrigerator using an eutectic solution as the refrigerating medium therein, by means including a pair of electrodes contacting the eutectic solution and connected in a circuit with indicating or regulating output means, and with a D.-C. or preferably A.-C. energy supply. In such systems, the measuring and/or regulating operation is based on the fact that the eutectic solution, on passing from the solid to the liquid state or vice versa, sustains a substantial change in electrical resistivity and such resistivity change is used to generate an electric signal controlling the indicator or regulator means.

The applicants have conducted extensive and systematic investigations on the afore-mentioned freeze-drying or lyophilization processes as applied to a large number and variety of perishable substances, both inorganic or organic. It has appeared as a result of such investigations that an extremely convenient and reliable means of directly ascertaining and monitoring the gradual modifications in the structure of the substances being processed, is provided by indicating the variations of certain physical, specifically electrical characteristics the variations of which are a direct reflection of the structural modifications in the substance. One such magnitude that can be advantageously used is electrical resistivity of the substance, which resistivity rises to high values following the drying or desiccation step, and drops sharply as the structure of the substance changes from a totally frozen form to a more fluid state. Furthermore it has unexpectedly been found that many substances of the general type contemplated herein have resistivity values that do not depart from a comparatively narrow range under comparable conditions.

The present invention is based on the above findings, and broadly resides in a method of controlling or monitoring the freezing and/or freeze-drying operation on water-containing solid substances, which comprises continually surveying throughout the operation the variations of a selected electric characteristic, e.g. resistivity or dielectric constant, of a sample of the substance itself being processed and eventually controlling the temperature applied to the substance so as to maintain said characteristic at a desired value at all times throughout the process.

In carrying out the invention, a sample of the substance being processed and subjected to the same conditions as those to which the substance as a whole is being exposed may have a constant voltage applied to it through suitable electrode means, and the variations in electrical impedance, i.e. resistance or capacitance, of the sample (due to the structural changes in the substance), may be measured by means of any suitable measuring circuit. The sample may be placed in a flask of electrically-insulating material provided with a pair of conductive electrodes penetrating at spaced points into the substance of the sample. The electrodes are connected in an external circuit with a suitable source of electric energy, for example in a conventional balanced bridge circuit or the like in which the impedance of the sample is balanced against an impedance of adjustable constant or variable value. If the selected characteristic is resistivity, a D.-C. voltage source may conveniently be used and the circuit would measure the D.-C. resistance of the sample. If the selected characteristic is the dielectric constant, the electrodes provided in the sample container would be in the form of capacitor plates and an A.-C. voltage source would be used so as to measure the capacitance of the sample.

The improved monitoring method has a number of outstanding advantages when applied to industrial freezing or freeze-drying plant, particularly lyophilizing or low-temperature dehydrating plant. The efficiency and production rate of the apparatus are both increased because the operating temperature is at all times maintained at a value very closely approximating the desirable optimum, positively averting the danger of thawing and resulting damage to the substance while at the same time maintaining the fastest operating rate consistent with safety.

The need for conducting a large number of preliminary tests prior to starting a commercial process, as was heretofore required, is eliminated by the invention. Since the electrical resistivity of a large number of the substances to which lyophilizing processes are applicable all lie within a relatively narrow range it becomes possible in a great number of cases to use substantially identical laws of variation for the resistivity of the sample with time without extensive preliminary testing of each individual substance. In fact, in many cases highly satisfactory results have been obtained by simply maintaining the resistivity (or dielectric constant) of the substance at a constant value throughout the process. The invention readily permits of achieving completely automatic operation in the performance of the process with attendant economic advantages. For such purpose any of the conventional types of feedback regulating techniques, that have by now attained an advanced degree of development in automatic processing systems, may be applied.

An exemplary embodiment of the invention will now be described for purposes of illustration but not of limitation with reference to the accompanying drawings, wherein.

Figure 1:
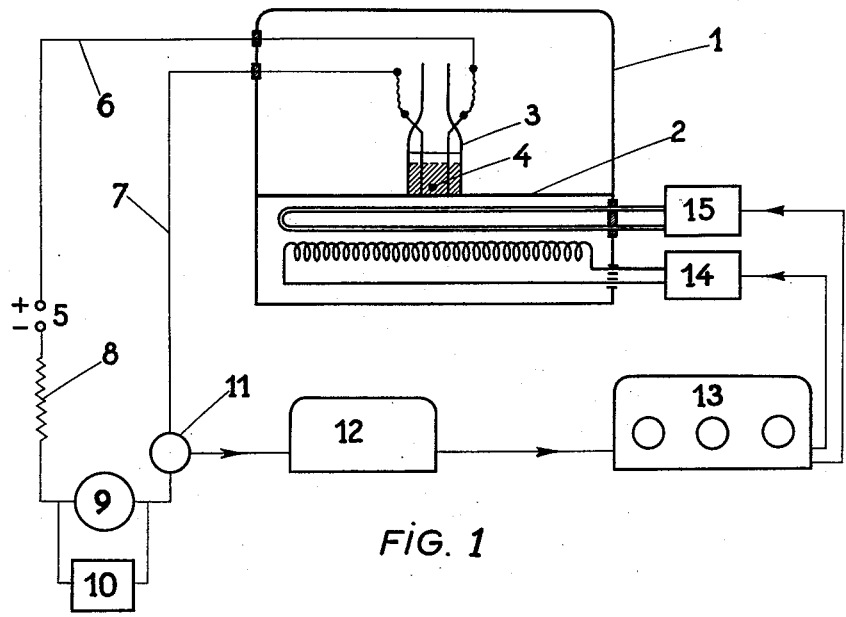
FIG. 1 is a highly schematic diagrammatic showing of a set-up for monitoring a lyophilizing process by the electrical resistance measurement of a sample.

In the system diagrammatically illustrated in FIG. 1, a freeze-drying apparatus 1 comprises a sealed enclosure containing an intermediate tray-like support 2 on which is positioned a container 3 having a sample 4 placed therein. The container 3 containing the sample is merely a part of the whole batch 3'. The container 3 will be described with reference to FIG. 2. In the area of the enclosure 1 underlying the supporting tray 2 is a heating device illustrated as an electrical resistance element connected to a heating control circuit 14, and a cooling device diagrammatically shown as a U-shaped tube connected with a flow-circuit 15 for cooling medium such as brine, or an evaporable cooling medium, supplied from a compressor. The enclosure 1 is connected to suitable evacuating means, not shown, such as the combination of a two-stage vane pump and a diffusion pump, or any other means capable of maintaining in the enclosure a degree of vacuum, substantially in the range from $10^{-2}$ to $10^{-4}$ mm. Hg, or other suitable range depending on the temperatures used.

Figure 2:
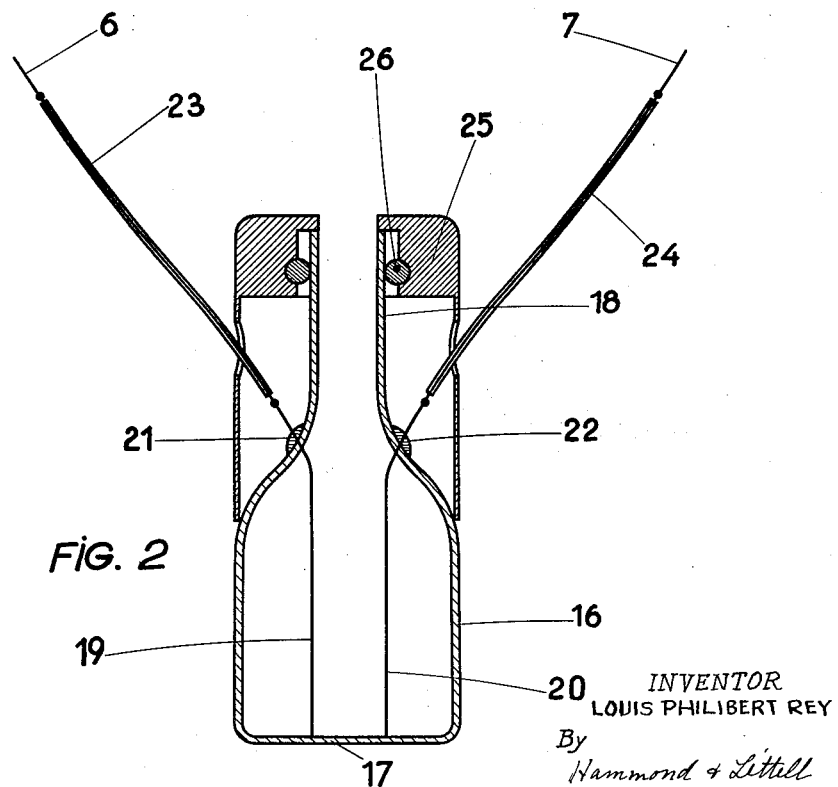
FIG. 2 is a larger-scale and more detailed view of one form of a sample container usable according to the invention where the selected controlling characteristic of the sample is resistivity.

Referring to FIG. 2, the sample flask comprises in one desirable form a glass flask 16 having a flat bottom 17 and a cylindrical neck 18 of relatively narrow elongated form. Extending vertically in the body of the flask are a pair of spaced wires 19, 20 made of platinum or other suitable conductive and inert metal which are sealed to the bottom 17 at their lower ends, and are passed out through opposite sides of the flask wall by means of fused joints 21 and 22 for connection with the pair of insulated conductors 23, 24 the outer terminals of which are adapted for connection with an external circuit. A protective outer insulating cover 25 is fitted around the neck of the flask and the electrode sealing means by way of an annular gasket 26. The external circuit is shown herein as comprising a source of stable D.-C. voltage 5 having one end connected through lead 6 with one of the electrodes, 19, and its other terminal connected by way of a limiting resistor 8 to a suitable impedance, e.g. an indicator instrument 9 in parallel with which a recording device may be connected as indicated at 10. The opposite terminal of the indicator 9 is connected with one input terminal of a sensitive electric signal generator or detector device 11 having its other input connected through lead 7 with the other electrode wire 20. The signal generator 11 may be of any suitable type capable of serving as a differential device to provide an output signal of one or the opposite polarity (or phase condition) depending on the sense of the difference between the potentials applied to its two inputs. Various devices suitable for this purpose are known in the art so that further description appears superfluous. The output from generator 11 may be applied to the input of a switching control unit 13 adapted to operate both control circuits 14 and 15 of the heating and cooling means respectively in response to the electric signal applied to its input. For example, with a signal of one polarity applied to control switching unit 13 said unit may act to establish a first circuit condition in which an energizing circuit is completed at 14 for the heating resistance while another energizing circuit for operating an electrovalve feeding cooling fluid from circuit 15 to the cooling tube in the enclosure is closed whereby the space within the enclosure is heated; while in the event of a signal of the opposite polarity applied to switching unit 13 the reverse conditions would be established and the space in enclosure 1 would be cooled.

If desired, a programming unit 12 may be further connected in the circuit ahead of the switching unit 13 and may serve to modify the operation of the switching control unit 13 in accordance with some preestablished program recorded therein.

In operation, a sample 4 is placed in the flask 16, and may either be previously cooled to a desired low-temperature before introduction into the enclosure 1 or the cooling may be effected within the enclosure as a result of the vacuum therein attaining a sufficiently high value to cause sublimation of ice within the sample and consequent drop in temperature of the sample. In the freeze-dried sample the resistivity is high, and it is generally possible so to adjust the control system that the switching unit 13 will energize heating circuit 14 to apply heat to the sample at the start of the process. As the temperature of the sample rises, its resistivity decreases. This decrease in the resistance in one arm of the circuit including the source 5, limiting resistor 8, indicator means 9—10, in its opposite arm, is manifested as a differential signal of a predetermined polarity generated by the device 11 and applied to the switching control unit 13, which thereupon may cut off the heating means and (if necessary) energize the cooling means for cooling the enclosure 1. By such feedback regulation the temperature of the tray 2 in the enclosure 1 is continually controlled so that the resistivity of the sample 4 may be held to a substantially constant preset value. It will be understood that in certain cases the switching unit 13 may be made to control the temperature by simply switching the heating means on and off rather than acting on the cooling means as well. This type of operation will in fact be found convenient in many cases since the sublimation of the sample will itself take up heat and tend to cause a drop in temperature.

By suitably presetting the system so that the resistivity in the sample will be held between predetermined narrow limits, it is found that the freeze-drying process may be readily so conducted as to operate continually at the highest possible temperature consistent with safety from any risk of damage to the substance by thawing, thereby ensuring maximum permissible operating rate.

Towards the end of the operation when the substance has been substantially completely dehydrated, the resistivity will increase in a continuous manner, so that the system then tends to apply heat so as to increase the temperature of the sample continuously. To avoid the consequent risk of damage to the substance, conventional thermostatic means including a suitable temperature probe, not shown, positioned in the flask 16 may be used in order to discontinue the heating when the temperature of the dried sample reaches a preset limiting value. At the same time the thermostatic system may serve to operate a visual or audible alarm.

Instead of monitoring the process so as to maintain substantially constant resistivity in the sample as described above, it may be found advisable in some cases so to operate the system that the resistivity will follow some predetermined law of variation with time. Such law may be preset as a stored program in a suitable memory within the program device 12, by any of the well-known techniques, so that the device 12 will apply a signal to switch control device 13 whenever the signal applied to the device 12 from signal generator 11 indicates that the resistivity has departed from the value specified therefor by the said program for the instant under consideration. Thus the switch control unit 13 will now control the heating and cooling means 14 and 15 in such a sequence as to hold the resistivity of the sample to the preset law of variation rather than holding it to a constant preset value as first described.

If desired, furthermore, the program unit 12 may have additional inputs connected with it for modifying the control sequence in accordance with one or more additional parameters of any desired character, as is well-known in automatic process control.

While the monitoring process of the invention as above described may be performed as a preliminary test, more desirably it may be made to proceed simultaneously with the actual process applied to a larger body of the same substance. Thus, the enclosure 1 with its heating and cooling means shown may constitute an actual freeze-drying apparatus in which a body of the substance to be preserved is being processed, with the sampling device 3 being positioned at a suitable point of said apparatus so as to be exposed to identical temperature conditions as the main body of the substance. Thus the commercial process may, if desired, be carried out without any preliminary testing and yet safe operation at maximum permissible processing rate will be reliably obtained.

If desired, in such a process, more than one sample of the material undergoing treatment may be simultaneously used. This may be desirable in cases f.i. where the composition of the substance is not homogeneous throughout, in order to secure more representative sampling. Where more than one sample is used, the electric signals derived from the respective control circuits may be mixed to provide a mean or average signal applied to a common control unit. Thus, the respective sampling flasks may be connected in a series or a parallel circuit to provide an over-all output voltage or current signal corresponding to the sum of the individual voltage or current signals produced by the flasks.

As a further alternative, the apparatus may include a a plurality of shelves or drying cabinets each provided with its individual temperature control means and each having at least one sampling flask positioned therein. In each such compartment the composition of the sample would correspond to the composition of the particular type of material being processed in said compartment. A common control unit, or a plurality of control units, may be used to operate the temperature control means in each compartment.

What I claim is:

1. In apparatus for controlling or monitoring a freeze-drying operation on water-containing solid substances for the preservation of said substances, the combination comprising: an evacuated chamber for freeze-drying said substances; temperature control means for controlling the temperature in said chamber; a container in said chamber for holding a sample of the substance freeze-dried in said chamber, said container having electrode means for electrically engaging said sample therein; first means connected to said electrodes for measuring an electrical characteristic of said sample while undergoing lyophilization and for producing an output signal continuously representative of the variations in said electrical characteristic in said sample during lyophilisation; and second means responsive to said output signal and connected to said temperature control means for control thereof in accordance with said variations; said second means having an input.

2. The combination of claim 1, with third means, having an output, said third means being connected to said first means for modifying the output signal thereof in accordance with prescribed data; and means connecting the output of said third means to said input of said second means.

3. The combination of claim 1, wherein said temperature control means comprises a heating means and a cooling means.

4. The combination of claim 1, wherein said electrodes comprise conductors engaging spaced apart portions of said sample, and said first means measures the resistivity between said spaced apart portions.

5. The combination of claim 1, wherein said electrodes comprise spaced apart capacitor plates, and said first means measures therebetween the dielectric constant of the sample.

6. The combination of claim 1, including signal producing temperature measuring means engaging said sample and thermostatic means responsive to said temperature measuring means and connected to said second means, whereby to prevent the application of heat beyond a predetermined sample temperature.

References Cited in the file of this patent
UNITED STATES PATENTS

| | | |
|---|---|---|
| 2,358,163 | Heym | Sept. 12, 1944 |
| 2,645,461 | Brown et al. | July 14, 1953 |
| 2,767,118 | Gaymont | Oct. 16, 1956 |
| 2,904,968 | Spencer | Sept. 22, 1959 |
| 2,994,132 | Neumann | Aug. 1, 1961 |